US005789456A

United States Patent [19]
Willson et al.

[11] Patent Number: 5,789,456
[45] Date of Patent: Aug. 4, 1998

[54] MANUFACTURE OF NON-CFC CELLULAR RESOL FOAMS USING PERFLUORINATED ETHERS

[75] Inventors: Jennifer M. Willson, Westerville; Vyacheslav S. Grinshpun, Granville, both of Ohio; Ruben Santos, Mississauga, Canada

[73] Assignee: Owens Corning Fiberglas Technology, Inc., Summit, Ill.

[21] Appl. No.: 920,616

[22] Filed: Aug. 27, 1997

Related U.S. Application Data

[62] Division of Ser. No. 734,947, Oct. 22, 1996.

[51] Int. Cl.$^6$ .................................................. C08J 9/14
[52] U.S. Cl. ................... 521/114; 521/88; 521/98; 521/131; 521/181
[58] Field of Search .................... 521/114, 131, 521/88, 98, 181

[56] References Cited

U.S. PATENT DOCUMENTS

| | | |
|---|---|---|
| 3,770,668 | 11/1973 | Corbett et al. . |
| 3,960,792 | 6/1976 | Nakamura . |
| 4,530,939 | 7/1985 | Rickle . |
| 4,842,678 | 6/1989 | Noro et al. . |
| 4,972,002 | 11/1990 | Volkert . |
| 5,210,106 | 5/1993 | Dams et al. . |
| 5,211,873 | 5/1993 | Dams et al. . |
| 5,290,823 | 3/1994 | Volkert . |
| 5,407,963 | 4/1995 | Willson et al. . |
| 5,441,992 | 8/1995 | Santos et al. . |
| 5,451,615 | 9/1995 | Birch . |
| 5,489,619 | 2/1996 | Barcroft et al. . |

FOREIGN PATENT DOCUMENTS

| | | |
|---|---|---|
| 0305084 | 3/1989 | European Pat. Off. . |
| 0348199 | 12/1989 | European Pat. Off. . |
| 0439283 | 7/1991 | European Pat. Off. . |

*Primary Examiner*—Morton Foelak
*Attorney, Agent, or Firm*—C. Michael Gegenheimer; John W. Renner

[57] ABSTRACT

The invention relates to a process for producing non-CFC resol foams of low density using perfluorinated ethers along with a HCFC or CFC blowing agent, and to foams produced by such a process. The process generally comprises: (a) forming a mixture by combining a resol resin with a blowing-agent blend comprising (i) at least one blowing agent selected from the group consisting of hydrogenated chlorofluorocarbons and hydrogenated fluorocarbons and (ii) at least one perfluoroether additive selected from the group consisting of perfluorinated ethers; (b) adding an acid catalyst to the mixture to initiate foaming and form a foam; and (c) curing the foam to form a cured foam that is essentially free of CFCs.

5 Claims, 1 Drawing Sheet

MANUFACTURE OF NON-CFC CELLULAR RESOL FOAMS USING PERFLUORINATED ETHERS

CROSS-REFERENCE TO RELATED APPLICATION

This is a division of U.S. patent application Ser. No. 08/734,947, filed Oct. 22, 1996.

TECHNICAL FIELD AND INDUSTRIAL APPLICABILITY OF THE INVENTION

The present invention generally relates to processes of manufacturing non-CFC cellular resol foams of low density using a blowing-agent blend containing perfluorinated ethers. The invention further relates to foams produced using blowing-agent blends containing HCFC and/or HFC blowing agent(s) and perfluorinated ether(s).

The foams of the present invention are useful in a wide variety of insulating applications. Applications include use in making products from commercial roofing insulation and industrial cavity walls to residential sheathing for walls.

BACKGROUND OF THE INVENTION

Cellular foams have long been produced using chlorofluorocarbon (CFC) blowing agents. More recently, the industry has been attempting to phase out the use of ozone depleting substances such as CFCs in the production of foams. In this effort to minimize the effect on the environment, the industry has moved toward the use of hydrogenated chlorofluorocarbons (HCFCs) and hydrogenated fluorocarbons (HFCs) as blowing agents. For example, U.S. Pat. Nos. 5,489,619, 5,407,963 and 5,441,992 describe methods for producing non-CFC foams.

However, the use of HCFCs and HFCs in place of CFCs has resulted in a number of problems. Due to the high solvency (i.e., ability to solubilize resin or act as a solvent for resin) of some of these blowing agents, the resulting foams tend to have a larger cell size, which can have a negative impact on both thermal and mechanical properties of the foam. Furthermore, some of the less ozone-depleting blowing agents are gases at room temperature. Therefore, producing foams with these blowing agents can present a challenge particularly for some of the very low boiling blowing agents, where controlling the rate of expansion can be difficult.

While aiming to prepare foams using more environmentally friendly blowing agents, the industry has been striving to produce foams wit h better performance characteristics. Unfortunately, advances in reducing environmental impact have been accompanied by losses in the properties of the resulting foam. This was typically because the less ozone-depleting alternatives were more soluble than CFCs and resulted in foams having larger cell sizes with inferior thermal and mechanical properties. To date, substitutes are still sought that will avoid environmental concerns associated with the use of CFCs while essentially maintaining the foam mechanical and thermal properties. A blowing-agent system that is less harmful to the environment in addition to providing maintained or improved product performance is highly desired.

SUMMARY OF THE INVENTION

Accordingly, one object of the invention is to achieve an environmentally friendly process for producing resol foams having advantageous properties. These and other objects and advantages of invention, which will become apparent from the foregoing and the detailed description below, have been attained by the present invention.

We have discovered that the addition of perfluorinated ethers to HCFC and/or HFC blowing agents surprisingly improves the properties of resol foams. Not only do the perfluoroether (PFEs), when added in quantities of from about 1 to about 3 percent by weight based on the weight of the blowing agent, result in a foam with improved thermal performance and friability compared to foams made without the PFE additive, but the addition of the PFE to the foaming system improves the processability of the foam. In particular, improvements in processability include better control of wetness at the froth dispensed from the mix. The resulting PFE-blown foam typically is of a lower density with equivalent or improved properties over those of a non-PFE blown foam. The present invention therefore provides for the production of a low-density cellular foam with improved or preserved thermal and mechanical properties and with minimal negative impact on the environment.

Thus, one aspect of the present invention relates to a method or process for producing a closed-cell non-CFC resol phenolic foam using blowing agents. The process includes the steps of: (a) adding to a resol resin a blowing-agent blend comprising (1) one or more hydrogenated chlorofluorocarbons or hydrogenated fluorocarbons and (2) one or more perfluorinated ethers (perfluoroether); (b) adding an acid catalyst to initiate foaming of the blend and produce a foam; and (c) curing the foam. In another aspect, the invention relates to a blowing-agent blend comprising: (a) one or more members selected from hydrogenated chlorofluorocarbons and hydrogenated fluorocarbons; and (b) one or more perfluoroether. The blowing-agent blend preferably contains the perfluorinated ether(s) in a total amount of from about 1% to about 3% by weight based on the total weight of the blowing-agent blend (PFE and HCFC and/or HFC blowing-agent components). More preferably, the perfluorinated ethers are present in an amount of from 2 to 3 percent by weight, based on the total weight of the blend components. The invention further relates to foams produced via the processes of the invention.

BRIEF DESCRIPTION OF THE DRAWING

The FIGURE is a diagram illustrating how foam-cell height is determined. As depicted in the FIGURE, the cell height is based on the longest straight distance parallel to the direction of heat flow from one cell wall to the opposite cell wall.

DETAILED DESCRIPTION AND PREFERRED EMBODIMENTS OF THE INVENTION

Figure 1:
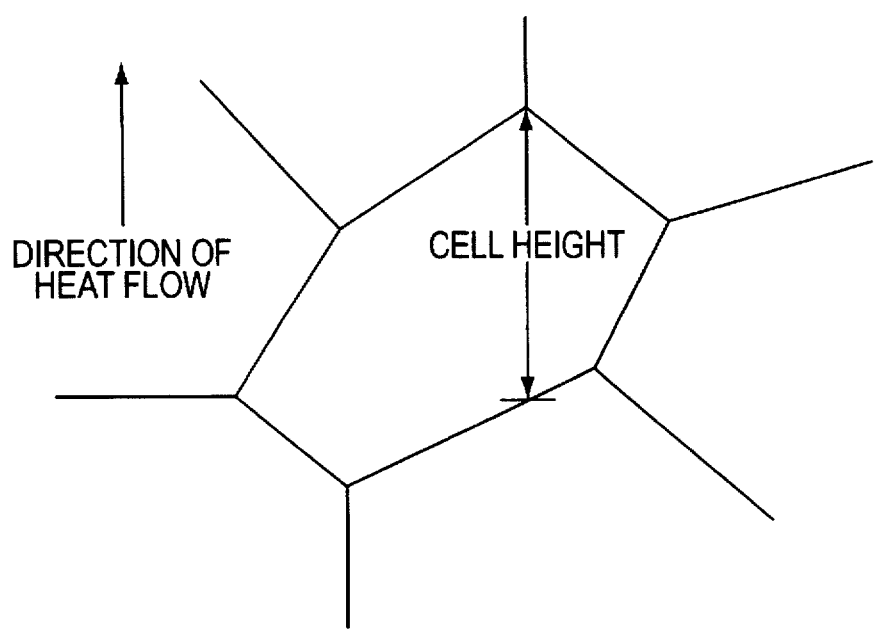

A closed-cell resol foam may be prepared using CFC-free blowing agents by steps including the following: (a) adding to a resol resin a blowing-agent blend essentially free of CFCs comprising (1) one or more hydrogenated chlorofluorocarbons or hydrogenated fluorocarbons and (2) one or more perfluorinated ethers (perfluoroether); (b) adding an acid catalyst to initiate foaming of the blend and produce a foam; and (c) curing the foam. In a preferred embodiment, the blowing-agent blend consists essentially of: (a) one or more members selected from hydrogenated chlorofluorocarbons and hydrogenated fluorocarbons; and (b) one or more perfluoroether.

Preferably, the HCFCs or HFCs used in the blends have low boiling points-in particular, boiling points below about 0° C. Exemplary low boiling-point HCFC or CFC blowing agents preferably used in the blends include 1-chloro-1,1-difluoroethane ("142b"), chlorodifluoro-methane ("22"), 2-chloro-1,1,1,2-tetrafluoroethane ("124"), 1,1-difluoroethane ("152a"), pentafluoroethane ("125") and 1,1,1,2-tetrafluoroethane ("134a"). In addition, the HCFCs and HFCs preferably have low thermal conductivities as gases. It is also preferred that the HCFCs and HFCs have low solvencies.

Preferred perfluorinated ethers are those represented by the general formula:

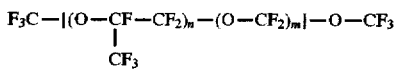

In the above formula, n is an integer of from 0 to 3 and m is an integer of from 0 to 1.

Specific examples of preferred perfluorinated ethers include polymerized, oxidized 1,1,2,3,3-hexafluoropropene, e.g., "Galden HT-55" and "Galden HT-70" (available from Ausimont SpA and Ausimont USA), which have typical properties (measured at 25° C.) as shown in the following chart:

| Typical Properties | HT55 | HT70 | Units |
|---|---|---|---|
| Boiling Point | 55 | 70 | °C. |
| Pour Point | * | −115 | °C. |
| Density | 1.67 | 1.68 | g/gm³ |
| Kinematic Viscosity | .45 | 0.60 | cst |
| Vapor Pressure | 228 | 165 | Torr |
| Specific Heat | * | 0.23 | — |
| Heat of Vaporization | * | 17 | cal/g |
| Thermal Conductivity | * | 0.0007 | W/(cm)(°C.) |
| Coeff. of Expansion | * | 0.0011 | cm³/(cm³)(°C.) |
| Surface Tension | * | 14 | dynes/cm |
| Refractive Index | * | 1.280 | — |
| Dielectric Strength | * | 40 | kV (2.54 mm gap) |
| Dielectric Constant | * | 2.1 | (1 kHz) |
| Dissipation Factor | * | 2 × 10⁻⁴ | (1 kHz) |
| Volume Resistivity | * | 1 × 10¹⁵ | ohm-cm |
| Solubility of water | * | 14 | ppm (wt.) |
| Solubility of Air | * | 26 | cm³ gas/100 cm³ liquid |
| Molecular Weight | * | 410 | — |

*Nonspecified properties should be similar to those for HT70, except that vapor pressure for HT55 will be higher and pour point will be lower.

The blowing-agent blend preferably contains the perfluorinated ether(s) in a total amount of from 1% to 3% by weight based on the total weight of the blend (PFE and HCFC and/or HFC blowing-agent components). More preferably, the perfluorinated ethers are present in a total amount of from 2 to 3 percent by weight based on the total weight of the blend components.

The acid catalyst may be a single catalyst or a blend of catalysts. Preferred catalysts are sulphonic acids, e.g., xylene and toluene sulphonic acids Optional ingredients may be added, either separately or in a system or blend along with another ingredient such as the acid catalyst. For example, urea may be added as a formaldehyde scavenger. Other optional modifiers such as resorcinol and diethylene glycol may be added, e.g., as taught in U.S. Pat. Nos. 4,883,824 and 4,945,077, the disclosures of which are incorporated by reference herein. For instance, a catalyst system containing one or more acid catalysts may be prepared by preblending the resorcinol and glycol and then combining them with the acid catalyst(s) or by preblending the acid catalyst(s) and glycol and then combining the preblend with resorcinol.

The non-CFC resol foams produced according to the invention preferably have a density of from 0.5 to 3.0 pcf (pounds per cubic foot), more preferably from 0.8 to 2.8 pcf. Such foams are particularly advantageous for use as insulating materials.

Foams may be prepared from resol resins or resin systems using the blowing-agent blends of the present invention by basic steps including (a) preparing the resol resin, (b) adding the blowing-agent blend (and any optional ingredients) to the resin to prepare a resol mixture, (c) adding the catalyst system (with or without optional ingredients) and foaming the mixture to produce a foam, and (d) curing the foam.

Preferably, the resol resin is prepared as follows. Phenol and formaldehyde are combined at a conventional starting molar ratio of phenol to formaldehyde-here, preferably using a molar ratio of from 1:1 to 1:4.5 phenol to formaldehyde, more preferably from 1:1.5 to 2.5. The high molar ratios of formaldehyde provides resins that are substantially free of phenol and that can be treated with a formaldehyde co-reactant or scavenger to reduce the initially high free-formaldehyde content. Modifying agents, such as melamine, resorcinol and/or urea, are preferably added; urea is an especially preferred modifying agent. The resin is then neutralized with 50% aqueous aromatic sulphonic acid. The resin is passed through a thin-film evaporator to reduce the free-water content. After the resin exits the thin-film evaporator, surfactant is added to the resin, preferably as described in U.S. Pat. No. 5,407,963, the disclosure of which is incorporated by reference herein. The amount and type of surfactant is suitably selected to obtain the desired cell structure (closed-cell content and cell size). Preferred surfactants are ethylene-oxide based nonionic surfactants, such as Pluronic F127 (available from BASF). Blends of surfactants, such as a 1/1 w/w blend of Pluronic F127 and Harfoam PI (available from Huntsman Chemical), may also be used.

A typical resin used for manufacturing resol foam has a viscosity on the order of from 5,000 to 40,000 cps at 40° C. and has a free-water content of 4–8%. In manufacturing phenolic foams from high-viscosity resins in accordance with the present invention, the resin utilized preferably has a viscosity on the order of from 7,000 to 20,000 cps at 40° C.

The blowing-agent blend is prepared in a suitable manner. For example, PFE is combined in a pressure vessel with an HCFC and/or HFC blowing agent. The blend is then mixed, e.g., by sparging. The blowing-agent blend is combined with the resol resin, e.g., by metering these ingredients to a mixer, which is preferably a high-shear, short-residence rotor/stator continuous mixing device.

To initiate foaming, the acid catalyst is added to the mixer along with the resol resin and blowing-agent blend, as well as any optional ingredients, while the combination is mixed. For example, a Micromotion mass-flow metering device may be used to deliver the blowing agent and catalyst, and a metering pump may be used to deliver the resin. Optional ingredients may be added in a variety of ways—e.g., a preblend of resorcinol and diethylene glycol may be combined with the acid-catalyst system (one or more acid catalysts), or a preblend of an acid catalyst and diethylene glycol may be combined with resorcinol.

It is important that the pressure inside the mixer be controlled to within a range that prevents premature foaming, typically a pressure of from 170 to 250 psig. The specific pressure range depends on the vapor pressure and boiling point of the blowing agent and on the temperature of the mixture in the mixer. A low-boiling blowing agent like HCFC 142b, which has a boiling point of −9.8° C. requires pressures in the foam mixer to be sufficiently high to prevent premature foaming.

The resulting thermosetting foam is cured. Preferably, foam is cured by conveying through a conveyor oven at a temperature of from about 60 to 95° C. more preferably of about 80° C. at a fixed rate sufficient to produce a board that is cured enough to handle. Preferably, preparation of the foams of the present invention further involves a ramping postcure procedure as follows: 0 to 70 minutes at 75°–85° C.; followed by 20 to 105 minutes at 90°–95° C.; followed by 60 to 170 minutes at 100°–105° C. The ramped postcure cycle can reduce the cell-wall damage that might otherwise occur to the foam if it were to be postcured under higher initial temperatures, while reducing the postcure time by gradually increasing the curing temperature, and therefore rate of cure, instead of maintaining the temperature at the relatively low initial temperature. The low initial postcure temperature and the ramping cycle help ensure that the green foam is not exposed to high temperatures when the foam cell walls are still weak and undercured. The ramping temperature cycle also allows the foam cell walls to cure and strengthen at a more controlled rate, with a gradual elimination of the water vapor produced during the curing reaction. A foam may thus be produced that advantageously can withstand increased internal cell pressure and resist cell rupture at higher temperatures. A ramped postcure cycle can also reduce cell wall damage that would occur under more severe constant temperature postcure conditions, such as immediate exposure to a temperature greater than 100° C., and can improve the thermal performance of the foam.

The invention will now be further described in reference to the following nonlimiting examples.

EXAMPLE 1

Preparation of Resol Resin

A resol resin used to produce foams as described below was prepared using a formaldehyde:phenol (F/P) mole ratio of 2.3:1, using formaldehyde (52% by weight of aqueous solution) and phenol (99% purity). The reaction was carried out under basic conditions (using 50% by weight sodium hydroxide solution) at elevated temperatures. When the Ostwald viscosity of the resin reached 62 cst (centistokes) as measured at 62° C., the reaction mixture was cooled and then neutralized with 50% by weight aqueous aromatic sulphonic acid. Urea was added as a formaldehyde scavenger at a level of 77% by mole of the residual formaldehyde. The resin was passed through a thin-film evaporator to reduce the water content from about 30% to 4–7% by weight. An ethylene oxide based nonionic surfactant (Pluronic F127 or a 1/1 w/w blend of Pluronic F127F and Harfoam PI) was then added at 3.5% by weight of the resin and mixed into the resin to form a homogenous blend. The final viscosity of the resin was 8000–12000 cps (centipoise) as measured at 40° C.

COMPARATIVE EXAMPLE 2

Preparation of Foam Using HCFC 142b

A non-CFC resol foam was prepared by mixing together the resol resin and surfactant of Example 1 with HCFC 142b blowing agent and an acid catalyst while mixing using a high-shear, short-residence rotor/stator continuous mixer. The HCFC 142b blowing agent was saturated with nitrogen at 200 psi (pounds per square inch) prior to introduction into the mixture. The catalyst system for initiating foaming was a combination of xylene and toluene sulphonic acids blended with resorcinol and diethylene glycol, as described in U.S. Pat. Nos. 4,883,824 and 4,945,077. The resol resin, blowing agent and catalyst system were continuously metered to the mixer by means of suitable flow-metering devices (Micromotion metering device for the blowing agent and catalyst blend, and a metering pump for the resin) in the following weight ratios:

| | |
|---|---|
| resin + surfactant | 100.00 |
| HCFC 142b | 7.43 |
| catalyst system | 11.15 |

The pressure inside the mixer was controlled to within a range of from 170 to 250 psig. The foamable mixture (resin/surfactant, blowing-agent blend, catalyst) exited the mixer through evenly spaced tubes and nozzles to form continuous beads of froth on a moving facer. This resulted in parallel lines of foam which knitted together as the froth expanded, to form a continuous sheet. The foam sheet was then cured by conveying through a conveyor oven at approximately 80° C. at a fixed rate to produce a board that was cured enough to handle. The boards were further cured for an additional 3–5 hours at 90°–105° C. to give the final product. The curing was as taught in U.S. Pat. No. 5,441,992, the disclosure of which is incorporated by reference. The resulting foam was then tested; the resulting properties are shown in Table 2.

EXAMPLES 3 AND 4

Preparation of Foams Using Blowing-Agent Blends

Following the procedure set forth in Example 2, non-CFC resol foams were prepared using PFEs as a blowing-agent additive using the components shown in Table 1. The perfluoroether additives used in these examples were fluids supplied by Ausimont USA having the tradenames "Galden HT55" and "Galden HT70", which are both polyethers. In Examples 3 and 4 a preweighed quantity of PFE was blown with nitrogen into the bottom of an enclosed pressure vessel containing HCFC 142b. This 142b/PFE blend was then saturated with nitrogen to 200 psi. This saturation or sparging process created enough turbulence to mix the blowing agent and PFE together such that no additional mechanical mixing was required. The resulting foams were tested, with the results summarized in the tables below.

The effect PFE on HCFC 142b-blown resol foams is reflected by the results from Comparative Example 2 and Examples 3 and 4 given Tables1 and 2:

TABLE 1

Resol Foam Formulations

| Examples | Type of PFE[1] | Blowing Agent (pph)[2] | Catalyst (pph)[3] |
|---|---|---|---|
| 2 | none used | 7.43 | 11.15 |
| 3 | HT-55 | 11.30 | 11.80 |
| 4 | HT-70 | 11.50 | 11.90 |

[1]PFE was added in Exs. 3 and 4 at 2% by weight of the blowing agent blend.
[2]Quantity of blowing agent, measured in parts per hundred parts of resin by weight (pph), includes the amount of PFE.
[3]Quantity of catalyst is given in parts per hundred parts of resin.

TABLE 2

Resol Foam Properties

| Example | Density (pcf) | Thermal Conductivity (BTU in/ft² hr F.) | Compressive Strength[4] | Friability[5] (% wt. Loss) | Cell Size (microns) |
|---|---|---|---|---|---|
| 2 | 2.50 | 0.130 | 201 | 23 | 130 |
| 3 | 2.07 | 0.126 | 168 | 17 | 135 |
| 4 | 1.93 | 0.126 | 175 | 17 | 127 |

[4]Compressive strength at 10% deformation.
[5]Friability tested according to ASTM C421

Scanning electron microscopy (SEM) was used to perform foam-cell height distribution measurements. SEM was used for analysis of the cell height and to observe characteristics of the foam's struts, walls, windows and general formation.

The method of analysis used a section of foam cut parallel to the machine direction from the center of a laydown bead. This section was then snapped to reveal the cellular structure in the direction of heat transmission from the bottom to the top surface. The resultant surface was then prepared for SEM viewing. The SEM micrograph samples were taken from the central region of the prepared samples, and the cell height measurements started at the center and proceeded upwards towards the top surface until 100 counts had been obtained. The location of measurement for the cell's height was the longest vertical line passing through the cell and is shown in the drawing FIGURE.

Even with a density reduction of about 25% in the PFE-containing foam, the thermal conductivity improved. To quantify the effect of blowing agent and formulation changes on foam brittleness, friability was measured according to ASTM Method C421 and was reported as weight loss as a percent of the whole. The objective was to produce a foam with a low friability. The addition of PFE to HCFC 142b reduced the friability by 25%, which is significant given that a density reduction alone can cause an increase in friability. Cell size was similar in the three examples. The reduction in compressive strength corresponds to the density reduction in Examples 3 and 4.

Further embodiments and modifications of the invention will be apparent through practice of the invention in light of the foregoing description. Thus, the invention is intended not to be limited by the above detailed discussion, but to be defined by the appended claims and their equivalents.

What is claimed is:

1. A CFC-free foam prepared by the process comprising the steps of:

(a) forming a mixture by combining a resol resin with a blowing-agent blend comprising (i) at least one blowing agent selected from the group consisting of hydrogenated chlorofluorocarbons and hydrogenated fluorocarbons and (ii) at least one perfluoroether additive selected from the group consisting of perfluorinated ethers;

(b) adding an acid catalyst to the mixture to initiate foaming and form a foam; and (c) curing the foam to form a cured foam that is essentially free of CFCs.

2. A foam according to claim 1, wherein the resol resin is prepared by a method comprising reacting phenol with formaldehyde at a molar ratio of from 1:1 to 1:4.5.

3. A foam according to claim 1, wherein the resol resin has a viscosity at 40° C. of from 7,000 to 20,000 centipoise.

4. A foam according to claim 1, further comprising adding to the resol resin at least one modifying agent selected from the group consisting of urea, resorcinol, and melamine.

5. A foam according to claim 1, further comprising the step of:

(d) postcuring the cured foam using a ramping procedure comprising subjecting the cured foam: for a time of from 0 to 70 minutes to a temperature of from 75° to 85° C., then for a time of from 20 to 105 minutes to a temperature of from 90° to 95° C., and then for a time of from 60 to 170 minutes to a temperature of from 100° to 105° C.

* * * * *